No. 896,278. PATENTED AUG. 18, 1908.
J. M. DIXON & J. F. BARWICK.
REMOVABLE VEHICLE SEAT.
APPLICATION FILED SEPT. 7, 1907.
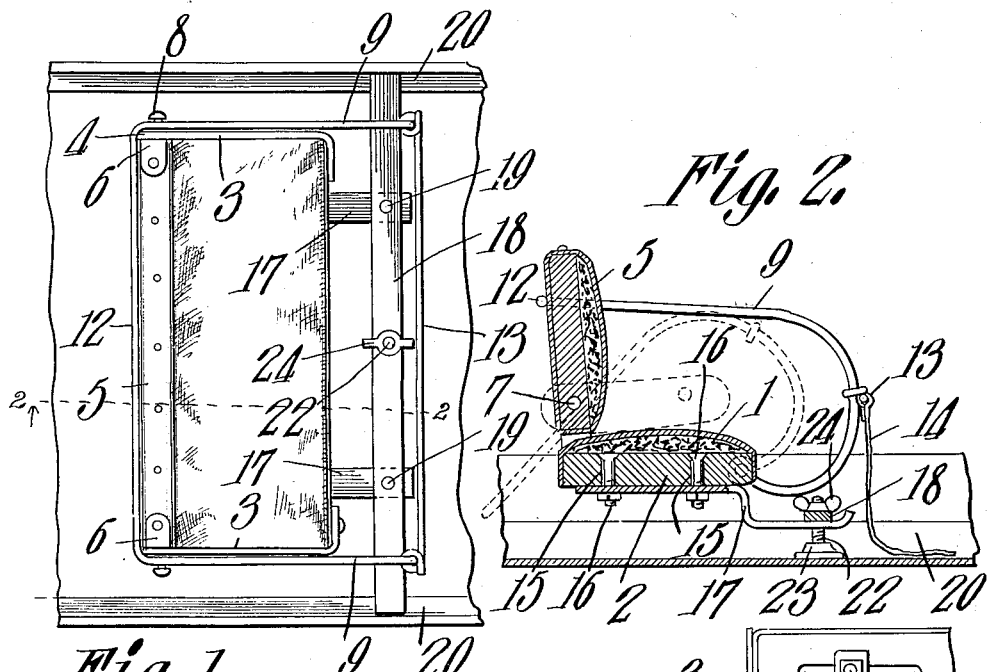
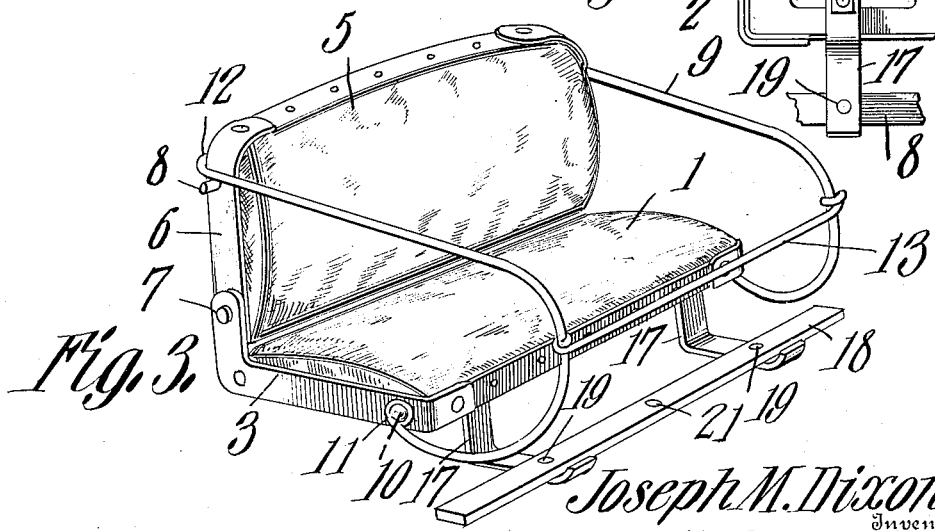
Joseph M. Dixon
Joseph F. Barwick
Inventors

UNITED STATES PATENT OFFICE.

JOSEPH M. DIXON AND JOSEPH F. BARWICK, OF AYDEN, NORTH CAROLINA.

REMOVABLE VEHICLE-SEAT.

No. 896,278.             Specification of Letters Patent.         Patented Aug. 18, 1908.

Application filed September 7, 1907. Serial No. 391,817.

To all whom it may concern:

Be it known that we, JOSEPH M. DIXON and JOSEPH F. BARWICK, citizens of the United States, residing at Ayden, in the county of Pitt and State of North Carolina, have invented a new and useful Removable Vehicle-Seat, of which the following is a specification.

This invention relates to a removable seat for vehicles, such as buggies and other carriages, the object of which is to provide an easily detachable seat for children at the rear of the vehicle, which, when not in use, may be folded or entirely removed.

In the accompanying drawing:—Figure 1 is a plan view of a portion of a vehicle and the removable seat in place. Fig. 2 is a longitudinal sectional view on the line 2—2 of Fig. 1. Fig. 3 is a perspective view of the seat removed from the vehicle. Fig. 4 is a bottom plan view of one end of the seat.

Similar reference numerals are used for like parts in all the figures of the drawing.

The seat proper, 1, is made of a flat board 2 of such dimensions as necessity or occasion demands, covered with any material, upholstered, or left uncovered, as desired. Fastened to each end of the seat and at the rear is a bracket 3 having an upturned end 4 in which the back 5 is pivoted. The brackets may be short ones, or they may extend along the ends of the seats and bend around to the front.

The back 5 is similar in construction to the seat 1 with end strips 6 of metal which have near their lower ends outwardly projecting studs 7 journaled in the upturned ends 4 of the brackets 3. A pin 8 projects from each end strip 6 near its top to sustain the arm rests 9 now to be described.

Pivoted to each end of the seat 1 near the front is an arm rest 9 preferably made of round bar metal, one end having an eye 10 for the pivot 11 attached to the end of the seat or to the bracket 3. The arm rest curves from the pivot 11 forwardly and upwardly in an approximate semi-circle, and thence extends rearward with a slight upward inclination to the back 5 and there rests on the pins 8, as shown in Fig. 3. A rod 12 connects the two arm rests behind the back of the seat, and it also serves as a stop for limiting the rearward movement of said back. As a matter of economy and simplicity, the two arm rests 9 and the connecting rod 12 may be made of one piece, as shown in the drawing. Extending between the arm rests 9 in front of the seat is a rod 13 which may be made fast to the arm rests or removably connected thereto. To this rod the boot or apron 14 will be attached.

At each end of the seat board 2, both at the front and at the rear are longitudinal slots 15 through which bolts 16 pass for adjustably connecting the seat 1 to its supporting members. These members consist primarily of two feet 17 made of spring metal attached, as before stated, to the seat board by the bolts 16 which may be loosened and the feet adjusted lengthwise of the seat to any position desired. Near the front of the seat the feet 17 bend downwardly and then extend in a forward direction beneath a cross bar 18 to which they are attached by bolts or rivets 19. The cross bar 18 extends entirely across the carriage, its ends resting on the side sills 20. Through the center of the cross bar is a hole 21 for a screw 22 to pass through and enter a threaded nut 23 on the floor of the carriage. For convenience, a wing nut 24 is threaded on the screw 22 above the cross bar 18 to fasten the same in position and prevent any movement whatever of the seat.

When the seat is not in use, the back 5 turns forward on its pivot 7 to prevent dust from settling thereon, the arm rests being also turned on their pivots rearwardly, as indicated in dotted lines in Fig. 2, thus reducing the seat to a more compact form. The improved seat, while intended, primarily, for the use of children, may be put to another use, as carrying small packages, baggage, and similar articles, the seat being on springs, these articles will ride very easily and such things as are liable to be broken if carried in the ordinary manner in the vehicle will be safely transported when placed on this seat.

What is claimed is:—

1. A removable vehicle seat comprising a seat proper, brackets on the ends thereof, a foldable back pivoted in said brackets and having projecting supports on the ends, an arm rest pivoted to each end of the seat near the front and extending rearwardly to and behind said back, a cross bar connecting the arm rests behind the back above said supports, and a bar extending between the arm rests in front of the seat.

2. A removable vehicle seat comprising a seat proper, adjustable feet attached to the under side thereof and projecting in a forward direction, a cross bar secured to the feet and adapted to rest upon the sills of a carriage, a screw passing through the cross bar, a threaded nut secured to the floor of the vehicle and with which the screw engages to hold the seat in fixed position, a foldable back, arm rests having a connecting member disposed in rear of the back to brace the same, and a combined brace bar and apron support connecting the arm rests.

In testimony that we claim the foregoing as our own, we have hereto affixed our signatures in the presence of two witnesses.

JOSEPH M. DIXON.
JOSEPH F. BARWICK.

Witnesses:
A. D. WILLIAMS,
M. G. TAYLOR.